(12) United States Patent
Gonsalves et al.

(10) Patent No.: US 6,201,531 B1
(45) Date of Patent: Mar. 13, 2001

(54) METHODS AND APPARATUS FOR CHANGING A COLOR OF AN IMAGE

(75) Inventors: Robert Gonsalves, Wellesley; Chia-Sheng Chou, Cambridge; Brian C. Cooper, Sharon; Dion C. Scoppettuolo, Brookline, all of MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/612,777

(22) Filed: Jul. 10, 2000

Related U.S. Application Data

(63) Continuation of application No. 08/832,862, filed on Apr. 4, 1997.

(51) Int. Cl.⁷ ..................................................... H04N 3/14
(52) U.S. Cl. .......................... 345/150; 345/431; 345/442; 395/131
(58) Field of Search ..................................... 345/150, 431; 345/442; 395/131

(56) References Cited

U.S. PATENT DOCUMENTS

| | | | |
|---|---|---|---|
| 5,488,674 | * 1/1996 | Burt et al. ............................. | 382/284 |
| 5,557,339 | * 9/1996 | Dadourian ............................ | 348/586 |
| 6,128,001 | * 10/2000 | Gonsalves et al. .................. | 345/150 |

* cited by examiner

*Primary Examiner*—William A. Cuchlinski, Jr.
*Assistant Examiner*—Marthe Y. Marc-Coleman
(74) *Attorney, Agent, or Firm*—Kenneth L. Milik; Lawrence E. Monks

(57) ABSTRACT

The invention provides a mechanism and process for changing a color of an image. In this process, a source frame that includes the image is received. An alpha matte that covers an object in the source frame is created. An original color of a pixel in the source frame is changed when the pixel is covered by the alpha matte, and when a color distance between the original color of the pixel and a target color is below a predetermined threshold.

8 Claims, 5 Drawing Sheets

METHODS AND APPARATUS FOR CHANGING A COLOR OF AN IMAGE

This application is a continuation of application Ser. No. 08/832,862, filed Apr. 4, 1997.

FIELD OF THE INVENTION

The present invention relates generally to image editing systems, and more particularly, to a method and apparatus for changing a color of an image.

BACKGROUND OF THE INVENTION

Producers of still pictures and motion video programs use a variety of special effects to produce a final product. A graphics editor performs the task of adding special effects to still pictures and to motion video segments using a graphics workstation.

Color changing is a special effect that involves changing the color of certain pixels within one or more video image frames. One application of color changing involves modifying the color of an object to make it more or less noticeable in the video image frame. Another application of color changing is to repair a damaged portion of the video image frame. A third application of color changing is to add color to a video image frame to generate the appearance of one or more new objects in the video image frame.

To achieve a color change effect, the graphics editor, using a mouse, graphics tablet or similar input device, manually circumscribes an area of a video image frame that is to receive the color change effect using the graphics workstation. Then, the graphics editor changes the color of each pixel within the circumscribed area to a specified destination color.

Since every pixel within the circumscribed area is changed to the new destination color, the graphics editor must circumscribe the intended color change area with precision. If the graphics editor does a poor job of circumscribing the area, some pixels that were not intended to be changed may be changed, and some pixels intended to be changed may be left unchanged.

Generally, the graphics editor's ability to circumscribe an object in a video image frame is limited. One way for the graphics editor to circumscribe the object is by controlling a cursor on the graphics workstation by manually moving a mouse. In particular, the graphics editor attempts to exactly trace the border around the object with the cursor. Such work requires good hand-eye coordination and is typically painstaking.

Producing color change effects using the above-described technique has additional drawbacks. In particular, setting each pixel of an object to be a destination color generally makes the object look flat and two-dimensional rather than three-dimensional which is often preferred. Additionally, it is not practical for a graphics editor to perform this process on frames of motion video footage that may include a sequence of hundreds or even thousands of individual frames. Furthermore, conventional color correction algorithms performed on computers are complex and require substantial computer power.

SUMMARY OF THE INVENTION

The present invention overcomes these drawbacks by approximately identifying an object in an image, and changing an original color of the object only when the object is covered by an alpha matte, and when a distance between the original color and a target color is below a predetermined threshold.

Accordingly, an aspect of the invention is a computer-implemented process for changing a color of an image. In this process, a source frame that includes the image is received. An alpha matte that covers an object in the source frame is created. An original color of a pixel in the source frame is changed when the pixel is covered by the alpha matte, and when a color distance between the original color of the pixel and a target color is below a predetermined threshold.

DETAILED DESCRIPTION

Figure 1:
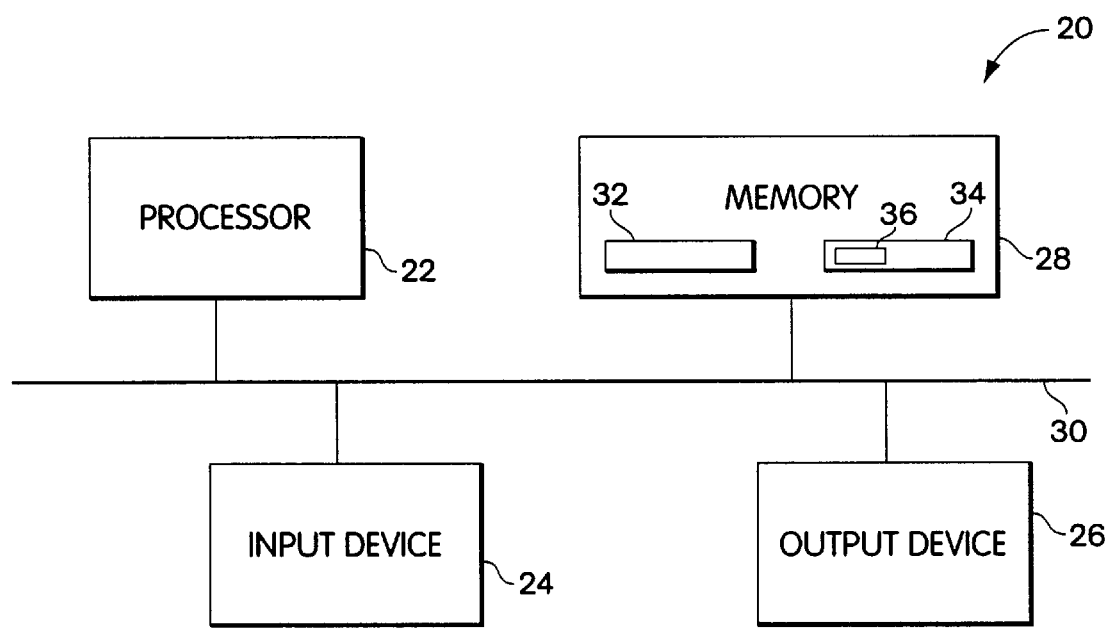
FIG. 1 is a block diagram of a general purpose computer suitable for an embodiment of the invention.

The present invention will be more completely understood through the following detailed description which should be read in conjunction with the attached drawing in which similar reference numbers indicate similar structures. All references cited herein are hereby expressly incorporated by reference.

An embodiment of the invention is directed to an apparatus for changing the color of an object in one or more video image frames. In particular, the apparatus includes a general purpose computer 20 having a processor 22, an input device 24, an output device 26, and memory 28 connected together through a computer bus 30. The memory includes primary memory (i.e., fast volatile memory such as dynamic semi-conductor memory) and secondary memory (i.e., nonvolatile memory such as magnetic disks). The memory 28 stores one or more programs 36 that, when executed by the processor 22, effect the color change. The input device 24 receives commands from a graphics editor, and the output device 26 displays results of the color change to the graphics editor. The results of the color change can be stored in the memory 28 for future use.

Figure 2:
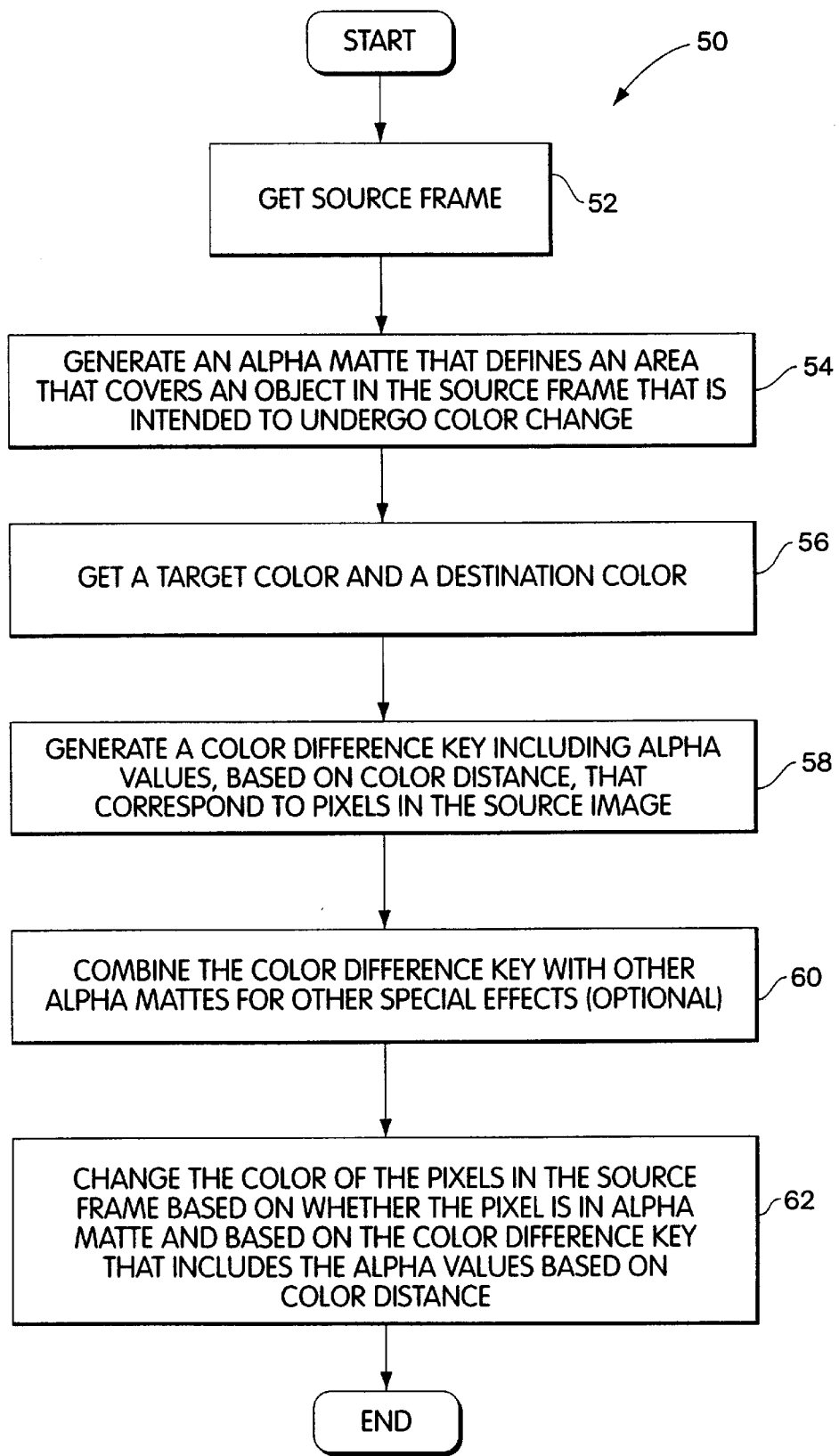
FIG. 2 is a flow diagram of a method, according to an embodiment of the invention.

The program 36, when executed on the general purpose computer 20, controls the general purpose computer 20 such that it performs a method 50, as illustrated in FIG. 2. In step 52, the graphics editor retrieves a video image frame on the computer 20 for color change processing. This video image frame is called the source frame.

In step 54, the graphics editor identifies an object in the source frame that is intended to undergo color change. The graphics editor does not need to circumscribe the object in the source frame exactly as in conventional methods. Rather, the graphics editor generates an alpha matte that approximately covers the object in the source frame. The alpha matte thereby provides a general indication of the location of the object in the source frame.

The alpha matte is a Bezier form that includes one or more Bezier curves. The graphics editor creates the alpha matte using the input device 24. The graphics editor may create the alpha matte (i.e., the Bezier form) in a number of ways.

A first way is for the graphics editor to expressly specify the Bezier form on a point-by-. point basis. That is, the graphics editor specifies points and tangent vectors that define a set of Bezier curves that form a closed Bezier form.

A second way is for the graphics editor to draw freehand, e.g., using a mouse, Bezier curves that form a closed Bezier form. This second way can be further enhanced by using a software scissors tool that allows the graphics editor to snap a portion of the closed Bezier form around the intended object in the image to more accurately surround the object. A third way is for the graphics editor to draw a rectangular box around the object to undergo the color change. A fourth way is for the graphics editor to draw an elliptical form around the object to undergo the color change. In each of the second, third and fourth ways, the system converts the graphics editor inputs into points and tangent vectors that define Bezier curves.

It should be understood that each of the above described ways of creating the alpha matte produces a closed Bezier form that surrounds the object intended to undergo the color change.

A fifth way to create the alpha matte is for the graphics editor to draw an open Bezier form that is defined by one or more Bezier curves and a width. The open Bezier form is two-dimensional and covers the object that will undergo color correction. It should be understood that this technique differs from the earlier described techniques since it generates an open Bezier form that covers the object rather than surround the object.

In step 56, the graphics editor inputs additional information such as a target color which identifies approximately a color within the alpha matte that should undergo color change, and a destination color which identifies approximately a color that the object is to be changed to.

In step 58, the computer generates a color change key that includes an alpha value α for each pixel of the source frame that is covered by the alpha matte. That is, the color change key is a two-dimensional array of alpha values α that resembles the shape of the alpha matte. Each alpha value α corresponds to a pixel in the source frame that is covered by the alpha matte, and indicates how much color change its corresponding source frame pixel should undergo. In particular, the alpha values α are within the range 0 to 255. An alpha value of 0 indicates that the corresponding pixel in the source frame should undergo no color change. An alpha value of 255 indicates that the corresponding pixel should undergo a fill or complete color change. An alpha value between 0 and 255 indicates that the corresponding pixel should undergo a partial color change. A partial color change is a change of pixel color to a color that is between the source pixel color and the destination color. As will be described in detail later, the alpha values a are based on color distance between the actual color values of the pixels in the source frame and the target color.

In step 60, the alpha matte may be further modified or combined with other alpha mattes to add other special effects. For example, the alpha matte can be combined with alpha mattes that add feathering and opacity to one or more areas in the source frame.

In step 62, the general purpose computer 50 changes the color of the pixels in the source frame based on whether the pixel is in the alpha matte and based on the color difference key that includes the alpha values a that are based on color distance. In one embodiment, the pixel color is specified by RGB values ranging from 0 to 255. In this embodiment, each color for a pixel $P_a$ of the source frame covered by the alpha matte is determined by the following equations:

$$\text{Red Component For Pixel } P_a = \frac{(\alpha_a \times [\text{Red in Dest. color}]) + ((255 - \alpha_a) \times [\text{Red in Orig. Pixel}])}{255} \quad \text{(Eq. 1a)}$$

$$\text{Green Component For Pixel } P_a = \frac{(\alpha_a \times [\text{Green in Dest. color}]) + ((255 - \alpha_a) \times [\text{Green in Orig. Pixel}])}{255} \quad \text{(Eq. 1b)}$$

$$\text{Blue Component For Pixel } P_a = \frac{(\alpha_a \times [\text{Blue in Dest. color}]) + ((255 - \alpha_a) \times [\text{Blue in Orig. Pixel}])}{255} \quad \text{(Eq. 1c)}$$

The color of each pixel in the alpha matte is determined according to Eqs. (1a), (1b) and (1c).

When the computer 50 is finished making the above determinations for each pixel in the alpha matte, the source frame has been converted into a color changed frame.

Figure 3:
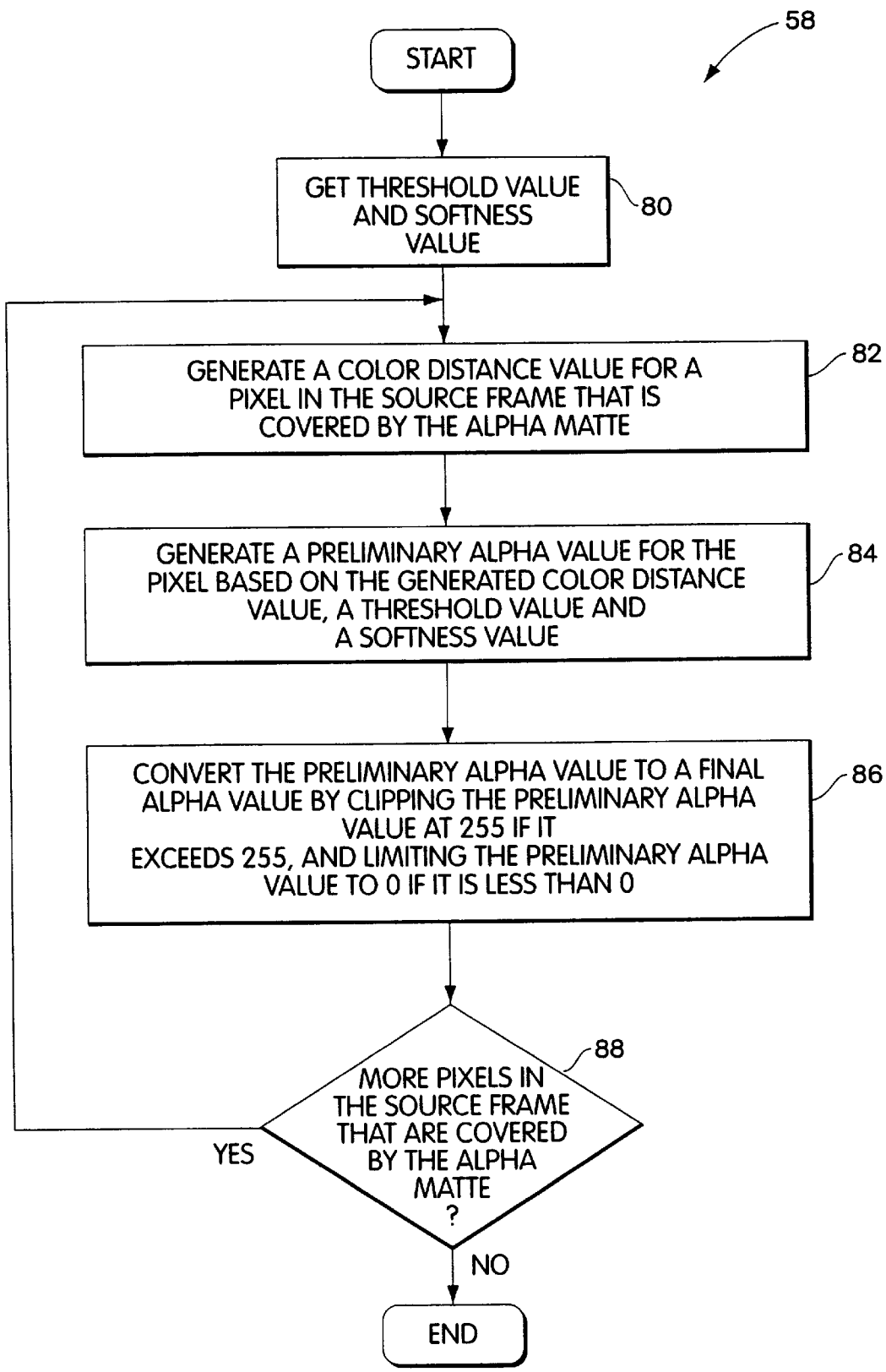
FIG. 3 is a flow diagram of a step of generating a color difference key, according to an embodiment of the invention.

A more detailed explanation of step 58 will now be provided. In step 58, an alpha value is determined for each pixel in the source frame that is covered by the alpha matte, as illustrated in FIG. 3. In step 80, a threshold value and a softness value are obtained from the graphics editor. These values may have been preset earlier in time.

In step 82, the computer 20 generates a color distance value for each pixel in the source frame that is covered by the alpha matte. The color distance value is an overall color distance based on individual color component distances. In one embodiment, the color distance value for each pixel is determined by individual color component distances using the following equation:

$$\text{Pixel color distance value} = \sqrt{((\Delta R)^2 + (\Delta G)^2 + (\Delta B)^2)}, \quad \text{(Eq. 2)}$$

where:

ΔR=R comp. of source pixel−R com of target color,

ΔG=G comp. of source pixel−G comp. of target color, and

ΔB=B comp. of source pixel−G comp. of target color.

In another embodiment, the color distance value for each pixel is determined as follows. First, the following individual color distances are determined for a pixel:

$$R_{distance} = |\Delta R = R \text{ comp. of source pixel} - R \text{ comp. of target color}| \quad \text{(Eq. 3a)}$$

$$G_{distance} = |\Delta G = G \text{ comp. of source pixel} - G \text{ comp. of target color}| \quad \text{(Eq. 3b)}$$

$$B_{distance} = |\Delta B = B \text{ comp. of source pixel} - B \text{ comp. of target color}|, \quad \text{(Eq. 3c)}$$

Then, a variable $V_1$ is set to the largest of the individual color distances for the pixel. A variable $V_3$ is set to the smallest of the individual color distances for the pixel. And, a variable $V_2$ is set to the intermediate value of the individual color distances for the pixel. The color distance value is then determined by the following equation:

$$\text{Pixel color distance value} = V_1 + \tfrac{1}{2}V_2 + \tfrac{1}{4}V_3. \quad \text{(Eq. 4)}$$

This second way of determining the pixel color distance value is described in *Graphic Gems V,* by Alan Wm. Paeth, entitled "Distance Approximations and Bounding Polyhedra," p. 8, which is hereby incorporated by reference.

In step 84, a preliminary alpha value α' is determined by the following equation:

$$\alpha' = \frac{([\text{threshold value}] - [\text{color distance}]) \times 255}{[\text{softness}]} \quad (\text{Eq. 5})$$

Then, in step 86, the computer determines converts the preliminary alpha value α' into an actual alpha value α. In particular, if the preliminary alpha value α' is within the range of 0 and 255 it is automatically considered to be the actual alpha value α. However, if the preliminary alpha value α' exceeds 255, it is converted to an actual alpha value of 255. Similarly, if the preliminary alpha value α' is less than 0, it is converted to an actual alpha value α having a value of 0.

In step 88, the above determinations are repeated for each pixel in the source frame that is covered by the alpha matte. The end result is a color difference key having alpha values a that: correspond to the pixels in the source frame that are covered by the alpha matte.

It should be understood that the threshold value controls which pixels within the alpha matte are to undergo color change. As indicated earlier, an alpha value α of 0 causes no color change in the corresponding pixel. The alpha value α is 0 whenever the pixel color distance value exceeds the threshold value since α is a negative number that becomes adjusted to 0. On the other hand, if the pixel color distance value is below the threshold value, the alpha value is a positive number and causes some amount of color change. The graphics editor can modify the threshold value so that more or less pixels of the source frame covered by the alpha matte undergo a color change.

Additionally, it should be understood that the softness value adjusts the amount of the color change on a global scale. A large softness value reduces the determined alpha values α. However, a low softness value increases the determined alpha values α. The graphics editor may adjust the softness value to modify the degree or amount of color change performed on the pixels undergoing color change.

Figure 4:
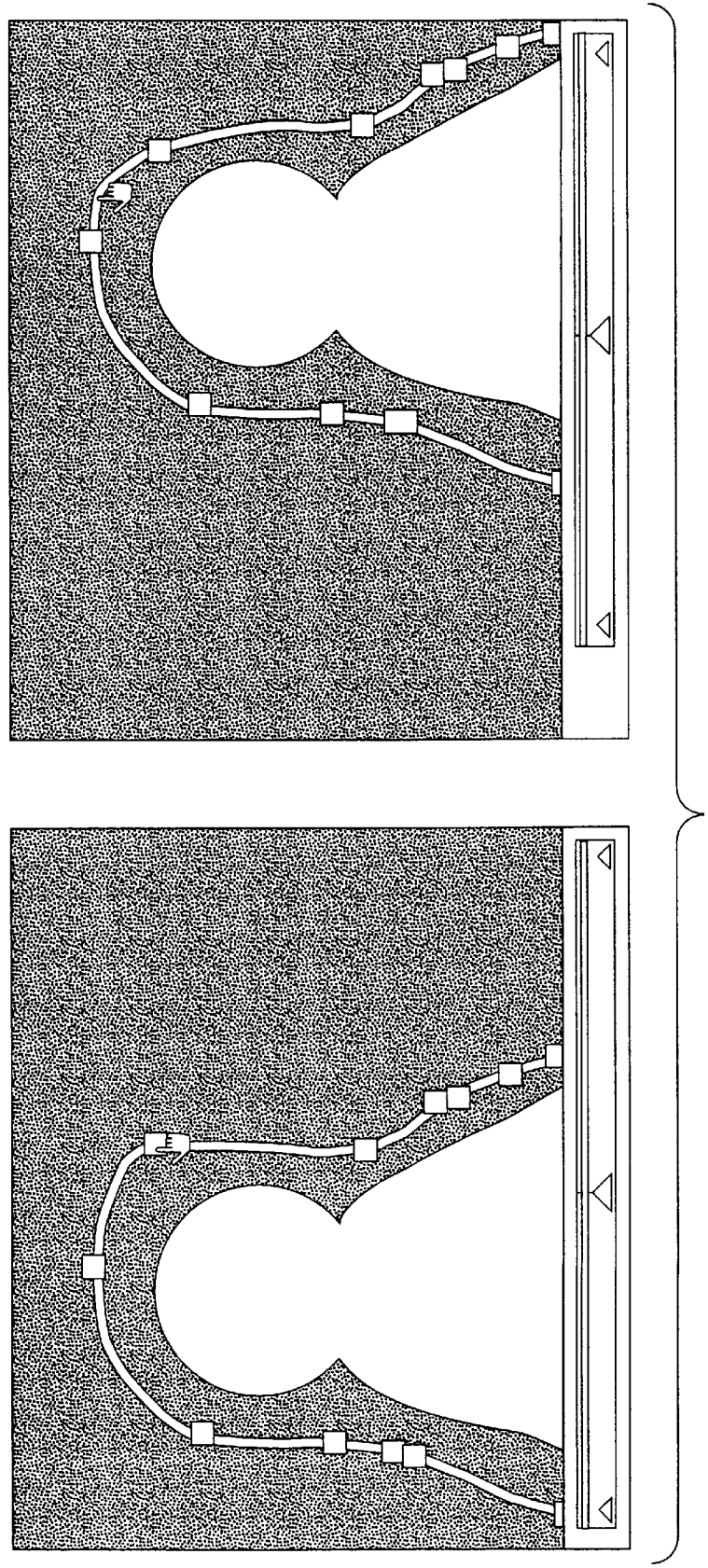
FIG. 4 is a block diagram illustrating the use of key frames within a sequence of frames according to an embodiment of the invention.

If the video frame that underwent the color change belongs to a sequence of frames, and the graphics editor wishes to make a similar color change to the other frames in the sequence, the graphics editor may move the alpha matte in the frame sequence using key frames, as illustrated in FIG. 4. The graphics editor should verify that the image undergoing the color change remains within the alpha matte as it moves during the frame sequence. The steps of the method can be repeated automatically using the general purpose computer 20, and the graphics editor need not manually define a Bezier form for each frame.

The operation of the system will now be further explained by way of example. The graphics editor is given a sequence of source frames showing a yellow frisbee that moves from one end of the image to the other. The graphics editor wishes to change the color of the frisbee from yellow to pink. The graphics editor does not need to circumscribe the frisbee with a high level of accuracy. Rather, the graphics editor, viewing the first source frame on the display device 26 of the computer 20, may draw a rough trace around the frisbee making sure the trace completely includes the frisbee image. The computer 20 converts the graphics editor's inputs into a Bezier form having one or more Bezier curves, and the Bezier form defines an alpha matte that covers the frisbee image. The computer 20 generates a color difference key that includes a set of alpha values corresponding to the pixels in the first source frame covered by the alpha matte. The alpha values are based on a threshold value, a softness value, and a target color that have been specified by the graphics editor earlier. The computer 20 then combines the alpha matte with other alpha mattes that provide other special effects (this is optional). Next, the computer 20 changes the color of the yellow frisbee from the original yellow source color to one or more shades of pink, according to the degree of change identified in the color difference key.

After the first source frame has been processed, the graphics editor identifies-key frames within the sequence of frames, and uses the key frames to move the alpha matte to new locations in other frames through the sequence of frames so that the moving frisbee image remains within the moving alpha matte. The computer 20 then color changes the remaining frames in the sequence by repeating the above described steps. If the sequence is displayed, the viewer sees a pink frisbee moving across the image.

Figure 5:
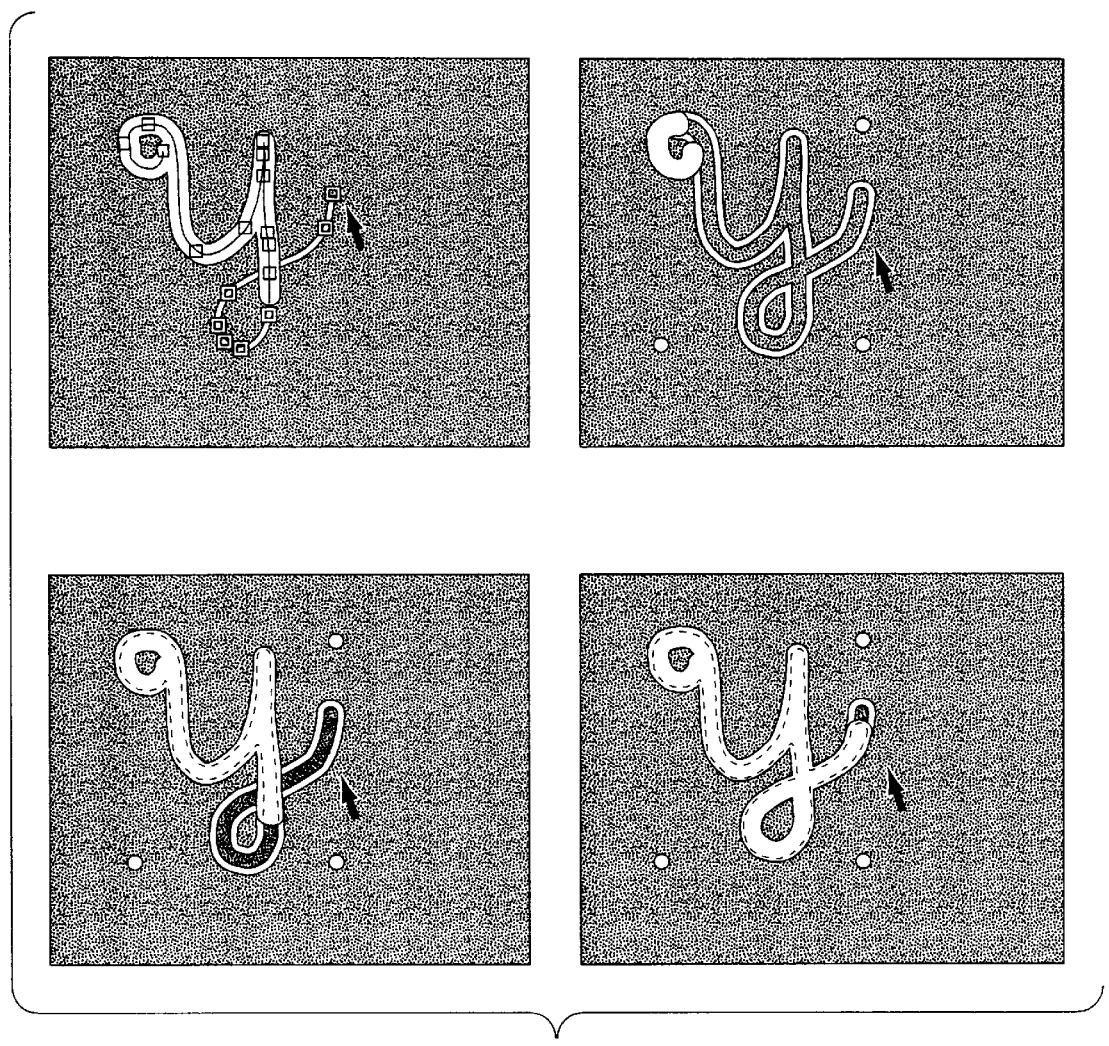
FIG. 5 is a perspective view of a display showing a plurality of Bezier curves that define a paint path, according an embodiment of the invention.

According to an embodiment of the invention, the alpha matte continues moving throughout the sequence of frames along a paint path. For example, the graphics editor may wish to create an effect of handwriting on a chalkboard. The graphics editor defines an open Bezier form made up of one or more Bezier curves to define the paint path. The first curve is defined using two points and two tangent vectors. Subsequent Bezier curves are defined using one point from a previous Bezier curve and four tangent vectors. The general purpose computer 20 determines the total curve length of the open Bezier form. Then, the total curve length is divided by the number of frames that will be used to display creation of the paint path. Next, the curves are displayed linearly, wherein each previously displayed curve is redrawn for each frame, as illustrated in FIG. 5. The effect is an appearance of handwriting during the frame sequence.

Discontinuities in the handwriting process such as dotting the i's and crossing the t's can be added by generating other paint paths that separately add dots and crosses.

Additionally, rather than evenly dividing the Bezier form by the number of frames, the curve segments may be given a variable size to make the handwriting appear more realist. Alternatively, time deltas may be incorporated so that the handwriting appears more realistic.

Modifications and enhancements can be made to the above-described embodiments, and are intended to be within the scope of the invention.

For example, step 60 involves changing the RGB components as the color change. If the system uses different color components other than red, green and blue, step 60 may be modified to use the other components instead. Furthermore, step 60 may include other paint modes. For example, step 60 may change the luminance of a portion of the image, or the hue of the portion of the image. According to an embodiment of the invention, a graphics editor may command the general purpose computer 20 to perform any of various paint modes provided by Matador, a software paint tool, available from Avid Technology, Inc., Tewksbury, Mass..

Furthermore, the alpha matte may be turned on or off. Accordingly, a second alpha matte may be generated and turned off. If the second alpha matte overlaps portions of another alpha matte that performs color change, the second alpha matte effectively erases any color change made by the other alpha matte. Such a feature may be used when certain objects undergo an undesired color change. For example, if a yellow frisbee traveling from one end of an image to another end through a sequence of frames is changed to pink, and part of the image includes a person wearing a yellow T-shirt. It is possible that the person's T-shirt may be changed to pink if it was covered by the alpha matte. The graphics editor may then create a second alpha matte to erase the color change of the T-shirt. Alternatively, the graphics editor may modify the shape of the alpha matte so that the T-shirt is not covered by the original alpha matte.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. A computer-implemented process for changing a color of an image, comprising the steps of:

receiving a source frame, disposed within a series of source frames, that includes the image;

creating an alpha matte that covers a portion of the image including determining a position of the alpha matte in the source frame based on key frames within the series of source frames so that the alpha matte covers the portion of the image; and changing an original color of a pixel in the source frame to a new color when the pixel is covered by the alpha matte, and when a color distance between the original color of the pixel and a target color is below a predetermined threshold.

2. The computer-implemented process of claim 1, wherein the step of creating includes a step of:

defining a Bezier form as the alpha matte.

3. The computer-implemented process of claim 2, wherein the step of defining the Bezier form includes a step of:

combining a plurality of Bezier curves so that a closed Bezier form is defined as the alpha matte.

4. The computer-implemented process of claim 2, wherein the step of defining the Bezier form includes a step of:

identifying a first Bezier curve and a width so that an open Bezier form is defined as the alpha matte.

5. The computer-implemented process of claim 4, wherein the first Bezier curve has two ends, and wherein the step of defining the Bezier form further includes a step of:

identifying a second Bezier curve having two ends, neither of which coincides with an end of the first Bezier curve.

6. The computer-implemented process of claim 4, further comprising steps of:

dividing the first Bezier curve into sections;

defining display times for each section so that displaying the sections according to the display times provides an appearance of handwriting.

7. The computer-implemented process of claim 1, further comprising steps of:

defining a second matte that covers at least part of the alpha matte; and maintaining the original color of the pixel when the pixel is covered by both the alpha matte and the second matte.

8. An apparatus for feathering a first image and a second image in a composite frame, comprising:

a general purpose computer including:
      a memory that stores a program; and
      a processor that, when executing the program, receives a source frame that includes the image; creates an alpha matte that covers a portion of the image; and changes an original color of a pixel in the source frame to a new color when the pixel is covered by the alpha matte, and when a color distance between the original color of the pixel and a target color is below a predetermined threshold.

* * * * *